US006405198B1

(12) United States Patent
Bitar et al.

(10) Patent No.: US 6,405,198 B1
(45) Date of Patent: Jun. 11, 2002

(54) COMPLEX DATA QUERY SUPPORT IN A PARTITIONED DATABASE SYSTEM

(75) Inventors: Roger Georges Bitar, San Jose; Jean Chen Ho, Saratoga; Jing-Song Jang, Cupertino; Erik Allan Kane, San Jose; James Louis Keesey, Sunnyvale; Angela Go Reyda, San Jose; Gerald Johann Wilmot, Marina, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/148,460

(22) Filed: Sep. 4, 1998

(51) Int. Cl.[7] ................................. G06F 17/30
(52) U.S. Cl. .................. 707/6; 707/3; 707/4; 707/200; 707/5
(58) Field of Search ............... 707/3, 4, 200, 707/5, 6

(56) References Cited

U.S. PATENT DOCUMENTS

| 4,853,843 | A | * | 8/1989 | Ecklund ................. 707/103 |
| 5,333,313 | A | * | 7/1994 | Heising ................. 707/4 |
| 5,448,727 | A | * | 9/1995 | Annevelink ................. 707/7 |
| 5,493,677 | A | * | 2/1996 | Balogh et al. ................. 707/3 |
| 5,511,190 | A | | 4/1996 | Sharma et al. ............. 395/600 |
| 5,546,575 | A | * | 8/1996 | Potter et al. ................. 707/100 |
| 5,551,027 | A | | 8/1996 | Choy et al. ................. 395/600 |
| 5,579,471 | A | | 11/1996 | Barber et al. ............... 395/326 |
| 5,617,119 | A | * | 4/1997 | Briggs et al. ............... 345/611 |
| 5,625,811 | A | | 4/1997 | Bhide et al. ............... 395/602 |
| 5,710,915 | A | * | 1/1998 | McElhiney ................... 707/3 |
| 5,717,919 | A | * | 2/1998 | Kodavalla et al. ............ 707/8 |
| 5,745,746 | A | | 4/1998 | Jhingran et al. ........... 395/602 |
| 5,751,286 | A | | 5/1998 | Barber et al. ............... 345/348 |
| 5,761,500 | A | * | 6/1998 | Gallant et al. ............... 707/10 |
| 5,794,229 | A | * | 8/1998 | French et al. ............... 707/205 |
| 5,799,310 | A | * | 8/1998 | Anderson et al. ........... 707/102 |
| 5,870,746 | A | * | 2/1999 | Knutson et al. ............ 707/101 |
| 5,907,849 | A | * | 5/1999 | Dias et al. ................. 707/202 |
| 6,047,291 | A | * | 4/2000 | Anderson et al. .......... 707/103 |
| 6,078,925 | A | * | 6/2000 | Anderson et al. .......... 707/103 |
| 6,092,062 | A | * | 7/2000 | Lohman et al. ............... 707/2 |
| 6,101,495 | A | * | 8/2000 | Tsuchida et al. .............. 707/4 |
| 6,112,207 | A | * | 8/2000 | Nori et al. ................. 707/101 |
| 6,115,717 | A | * | 9/2000 | Mehrotra et al. ........... 707/102 |
| 6,240,423 | B1 | * | 5/2001 | Hirata ....................... 707/104 |

* cited by examiner

*Primary Examiner*—Frantz Coby
(74) *Attorney, Agent, or Firm*—Sawyer Law Group LLP; Ingrid M. Foerster (57) ABSTRACT

In a database processing system with a partitioned database that provides relational extenders to support storage of and access to complex data types, metadata table rows are collocated with corresponding relational table partitions. Image indexes are generated and stored at system nodes with their corresponding relational table partitions. Image query processing is conditioned to account for the partitioned structure of the database.

27 Claims, 8 Drawing Sheets

COMPLEX DATA QUERY SUPPORT IN A PARTITIONED DATABASE SYSTEM

CROSS-REFERENCE TO RELATED APPLICATIONS

This application is related to the following and commonly-assigned patent applications:

U.S. patent application Ser. No. 08/487,988, entitled "A COMPUTER PROGRAM FOR DATABASE RELATIONAL EXTENDERS", filed Jun. 7, 1995 now U.S. Pat. No. 6,078,925, U.S. patent application Ser. No. 08/548,301, entitled "RELATIONAL DATABASE EXTENDERS FOR HANDLING COMPLEX DATA TYPES", filed Nov. 1, 1995, now U.S. Pat. No. 5,799,310, issued Aug. 25, 1998;

U.S. patent application Ser. No.: 08/829,104, entitled "EXTENDER USER INTERFACE", filed Mar. 31, 1997 now U.S. Pat. No. 6,069,627, and U.S. patent application Ser. No. 09/114,587, entitled "DATABASE RELATIONAL EXTENDERS FOR HANDLING COMPLEX DATA TYPES", filed Jul. 13, 1988 now U.S. Pat. No. 6,047,291.

All of these applications are incorporated by this reference in their entirety.

BACKGROUND OF THE INVENTION

1. Field of the Invention

This invention concerns relational databases, and, more specifically a partitioned relational database system comprising multiple database management systems each of which exclusively stores a partitioned copy of the data. The invention provides support in such a system for processing complex data types, such as images.

Database management systems (DBMSs) are widely used information resources for enterprises. One highly successful DBMS model is the relational database that is organized and accessed according to relationships between units of data in the database. The relations are typically manifested or embodied in the form of tables. Each table expresses some association between units of database content.

To expand data processing capabilities with respect to large databases, a number of database system models have been developed to integrate separate DBMSs with logic and support that enable them to operate as a single system. One of these models, the "shared nothing data system" typically includes multiple nodes, each comprising a processor and storage that is exclusive to the processor. The processors are linked by a network and their operations are synchronized and integrated by a message-passing facility that provides connectivity between each node and every other node of the partitioned system. There is a one-to-one relationship between each node and the portion of database contents stored thereat. In other words, each node owns and stores a specific segment of the database contents and has sole responsibility for physical access to that segment. One of the multiple nodes is designated as the coordinating node. A request for access to the database is received through the coordinating node and communicated therefrom to the correct node that owns the requested data.

While database system architectures continue to evolve, it is also the case that many new forms of data having multiple attributes, complex internal structures, and specialized behaviors are being stored in databases. These are referred to as "complex data types".

One example of specialized database processes that have been developed and implemented to support storage of and access to complex data in the form of images in a relational database system is given in U.S. Pat. Nos. 5,579,471 and 5,751,286, both commonly assigned with this application, and both incorporated herein by reference. These patents describe an image database system that supports queries by image content ("QBIC"). The first-incorporated patent application cross-referenced above sets forth a detailed description of relational extenders (including an image extender) that extend a relational database table with complex data types in such a way as to present them as a seamless extension of an existing relational database system. These relational extenders have been incorporated into the DB2™ database system available from the International Business Machines Corporation, Armonk, N.Y. In the current version of the DB2™ database system, an image relational extender enables QBIC operations to be performed with and on images stored in the system.

To date, database relational extenders have not been available for use in a partitioned relational database of the shared-nothing kind. Manifestly, the growing importance of data management in large enterprises, the operational efficiency that the partitioned model brings to such systems, and the increasing demand for use of complex data in such systems necessitates the investment of partitioned database systems of the shared-nothing type with the ability to support processing of such data types. This calls for appropriate adaptation of relational extenders for complex data types.

In particular, the progress in development of QBIC technology provides an opportunity to adapt the image database extender for use in a partitioned, shared-nothing database system.

SUMMARY OF THE INVENTION

Broadly, this invention concerns the modification of one or more database relational extenders so as to enable a partitioned database system of the shared-nothing model to store complex data types in the database system, and to process queries directed to the image data type. The relational extenders in the incorporated patent application include data structures and processes for receipt and processing of complex data types in a relational database system. The extender model treats a complex data type as an object possessing attributes. A complex data object has a unique object handle (identification label) that is stored in a column of a relational table to represent the object. The object handle points to one or more metadata tables. A metadata table either contains the object data or points to its location in the database system.

In a partitioned database system, the relations (that is, the tables) are partitioned horizontally according to partition keys. A partition key is defined over one or more columns of a table, and is used to divide the table into partitions. Each partition corresponds to a separate unit of storage and contains a portion of the data in the table. Each partition of the table is assigned to a node of the plurality of nodes that make up the partitioned, shared-nothing system. When assigned, the partition is sent to the node for storage at the node.

Triggers provided by the DB2™ database system allow automatic dispatch of specific procedures whenever a table in the relational database system is the subject of an update, deletion, or insertion, that is whenever a table is changed. For example, when image object data is inserted, deleted, or updated, the system invocation of the appropriate trigger results in creation of or changes to an "index" that represents the image by attributes that images generally have. Such attributes include average color, texture, color histogram, color location and so on.

Finally, the relational extenders support user defined functions (UDFs) that allow functions to be defined, written in a computer language, or derived from built-in functions. UDFs supported by the image relational extender permit users to define operations that are to be performed on images stored in a database.

This invention supports the application of relational extenders for complex data types in a partitioned database system of the shared-nothing model by collocating metadata table entries with corresponding relational table partitions at the proper nodes. The invention also provides for the indexing of image data at the node where an image object is to be stored. Finally, the invention provides for the support of image query UDFs at the nodes where the objects of the queries are stored.

Additional features of this invention will become evident from the following detailed description of the preferred embodiments for carrying out the invention and from the appended claims.

DETAILED DESCRIPTION OF THE PREFERRED EMBODIMENTS

The support of queries directed to complex data objects in a partitioned database system of the shared-nothing type has been achieved by adaptation of one or more relational extenders. The partitioned relational database model and the relational extenders are implemented in the DB2™ database system available from the International Business Machines Corporation, Armonk, N.Y. The adaptations of this invention are designed to implement one or more relational extenders in the partitioned shared-nothing model of the DB2™ database system. However, it should be understood that these adaptations are not limited to the DB2™ database system; indeed, they may be implemented with any number of other partitioned relational DBMSs. For convenience, however, the following description will be presented particularly in the context of an application to the DB2™ Extended Enterprise Edition (EEE) database system.

Figure 1:
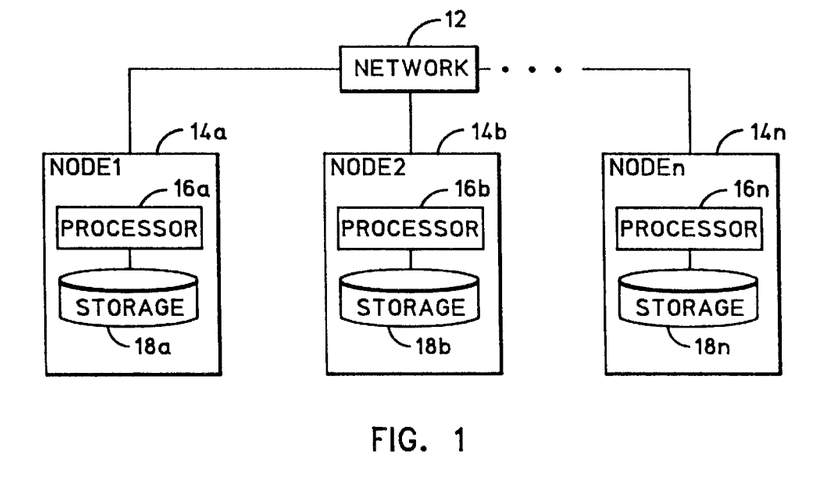
FIG. 1 is a block diagram of a partitioned database system of the shared-nothing type.

FIG. 1 depicts a parallel processing system 10 with a communications network 12 that provides intercommunication between multiple processing nodes, including processing nodes 14a–14n. Each processing node preferably includes a processing element 16a–16n and a storage element 18a–18n. Without limitation, the processors 16a–16n can comprise processes executing on one or more computers, respective processors of a multi-processor system, servers, or separate computers. The storage devices 18a–18n may comprise, for each processor, respective private external storage. In a shared-nothing database, respective partitions of a database are stored in the storage devices 18a–18n.

Figure 2:
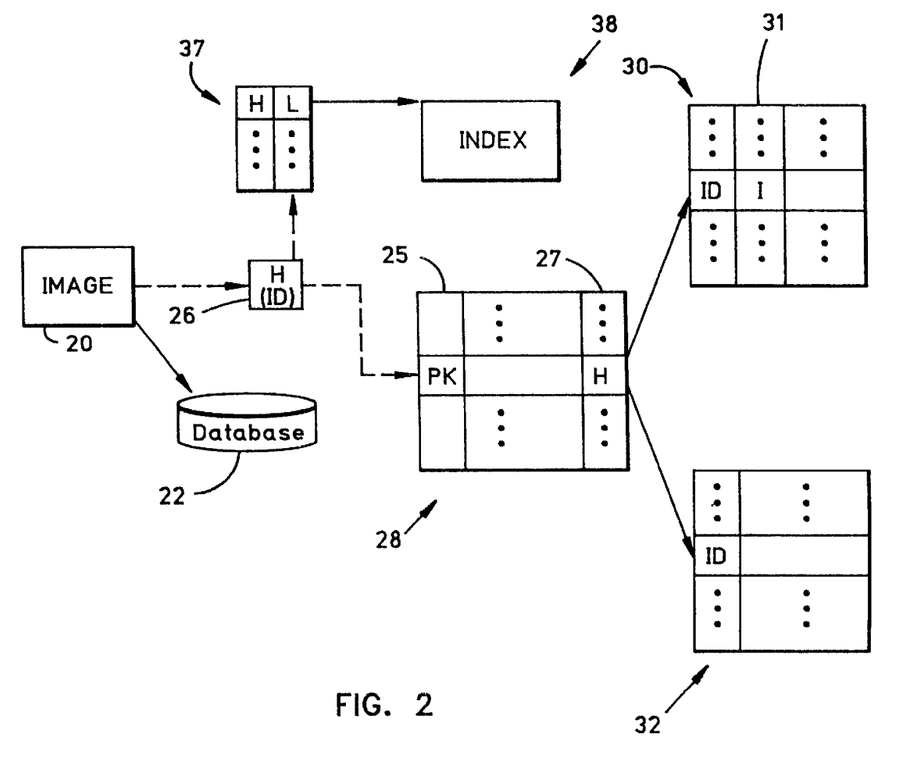
FIG. 2 is a diagram showing the structures of relational extenders and index catalogs of a relational database system.

FIG. 2 shows the structure of an exemplary relational extender in a relational database system, such as the DB2™ database system. In this regard, a relational extender is provided for a complex data type that is to be incorporated into the relational database system. The relational extender treats such a data type as an object having hidden attributes that are accessed through a functional interface. As an example, consider an image 20 that is to be stored in a relational database 22. In the database 22, an object is created that includes the image 20 and various related data structures. As shown in FIG. 2, the object has a unique object handle (identification label) 26 that is stored in a column 27 of a relational table 28 to represent the object. The object handle 26 includes identification data (ID) that identifies the complex data objects in corresponding rows of respective metadata tables 30 and 32.

The object will probably possess multiple attributes that are stored in the metadata tables 30 and 32. Those attributes are common to all objects, regardless of the data type, are stored in the table 30, which is termed a "base metadata table". Those attributes that are specific to the object data type (in this case the image data type), are stored in the metadata table 32, which is termed an "attribute metadata table". Preferably there is one base metadata table for each relational table, such as the table 28 and one attribute metadata table for each enabled extender in the table 28. In addition to other metadata, the base metadata table 30 includes a column 31 that contains either the image 20, or a pointer to its storage location. For convenience, this explanation will assume that the image is stored in column 3 1, although this is not intended to so limit this application. In the example of FIG. 2, the attribute metadata table 32 lists attributes that are specific to the image data type; such attributes may include average color, texture, color histogram, color location, and so on. The rows in the metadata tables include the information identifying the complex data object that they describe. This is indicated by the designation "ID" in the first column of each of tables 30 and 32.

For the specific example shown in FIG. 2, assume insertion of the image 20 into the database 22. This is accomplished by insertion of a row in the table 28. When the image is inserted, the handle 26 is generated and placed in the handle column of the relational table 28. The metadata rows for the image are generated and placed in the tables 30 and 32. The handle is also placed in an index catalog 37 where it is mapped to the storage location (L) of an index 38. At the time the image 20 is inserted, the index 38 is created and cataloged. The index 38 may be in the form of a table or other appropriate structure for storing numeric values that represent features of the object image 20.

Figure 3:
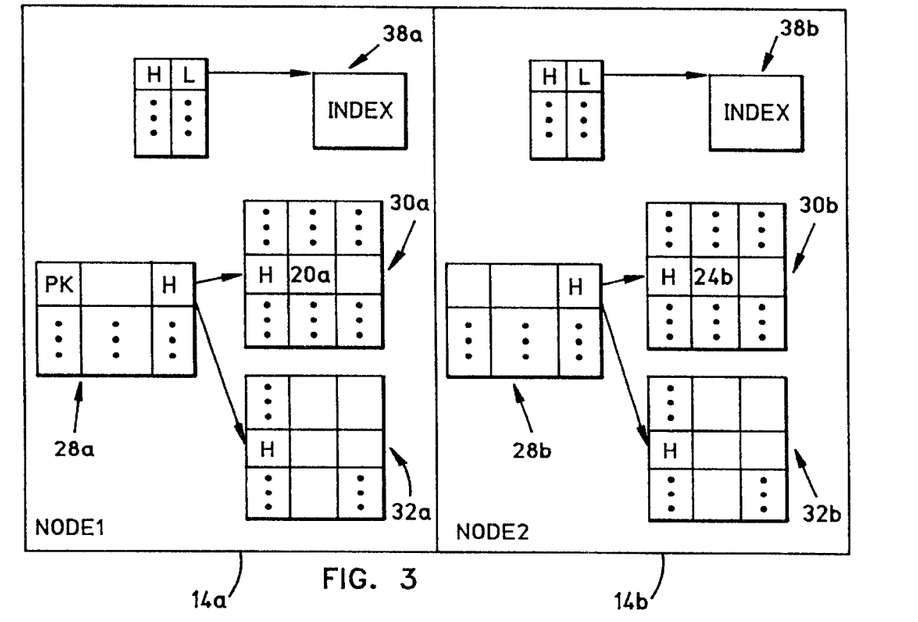
FIG. 3 is a diagram showing collocation of relational data and metadata according to this invention.

Image content queries, which are described in detail in the incorporated patents, are conducted on the indexes that represent images. The outcome of a QBIC query is a result set that may refer to or include one or more images. Depending upon the nature of the query, the images in a result-set may or may not be ranked. For example, consider the "table" query: "Find all images in Table y with an average color of about ( )". In this case, a user defined function (UDF), using the indexes of images stored in the database 22, would find images satisfying the query and return the results as a set of images (or image handles) ranked according to the distance between their average colors and the average color value specified in the query. Another query (termed a "score" query) might ask: "How close is the average color of image, to red". In this case, for the identified image, information denoting the distance of the identified image from red is returned;

The adaptation of relational extenders, such as the image extender illustrated in FIG. 2, to the partitioned database architecture of FIG. 1 is illustrated in FIG. 3. In FIG. 3 assume the invocation of at least one image extender and the data structures illustrated in FIG. 2. For a partitioned database system with two nodes 14a and 14b assume partitioning of the table 28 based upon a partition key (PK) defined on at least one column of the table 28, for example, on column 25. Partitioning the table 28 results in partition 28a, to be located at node 14a, and partition 28b, to be located at node 14b. In order to support insert, delete, and update operations of the table 28, rows of the metadata tables 30 and 32 must be collocated with the corresponding partitions of the table 28 at their respective nodes. Thus, metadata table rows 30a and 32a must be collocated at the node 14a with the table partition 28a. Similarly, the rows 30b and 32b of the metadata tables 30 and 32 must be collocated at node 14b with partition 28b of table 28. Furthermore, in order to support QBIC processing at the nodes 14a and 14b, indexes for the images referenced by the partitions 28a and 28b must be provided at the nodes 14a and 14b. Two such indexes are indicated by 38a, representing object image 20a, and 38b, representing object image 20b, are shown at nodes 14a and 14b. The invention concerns the collocation of the metadata rows with corresponding partitions of a relational table and the indexing required for the image relational extender that is necessary to support QBIC processing in the partitioned database context. The invention also concerns the processing of QBIC queries directed to the partitioned database.

Collocating Metadata with User Data

Figure 4:
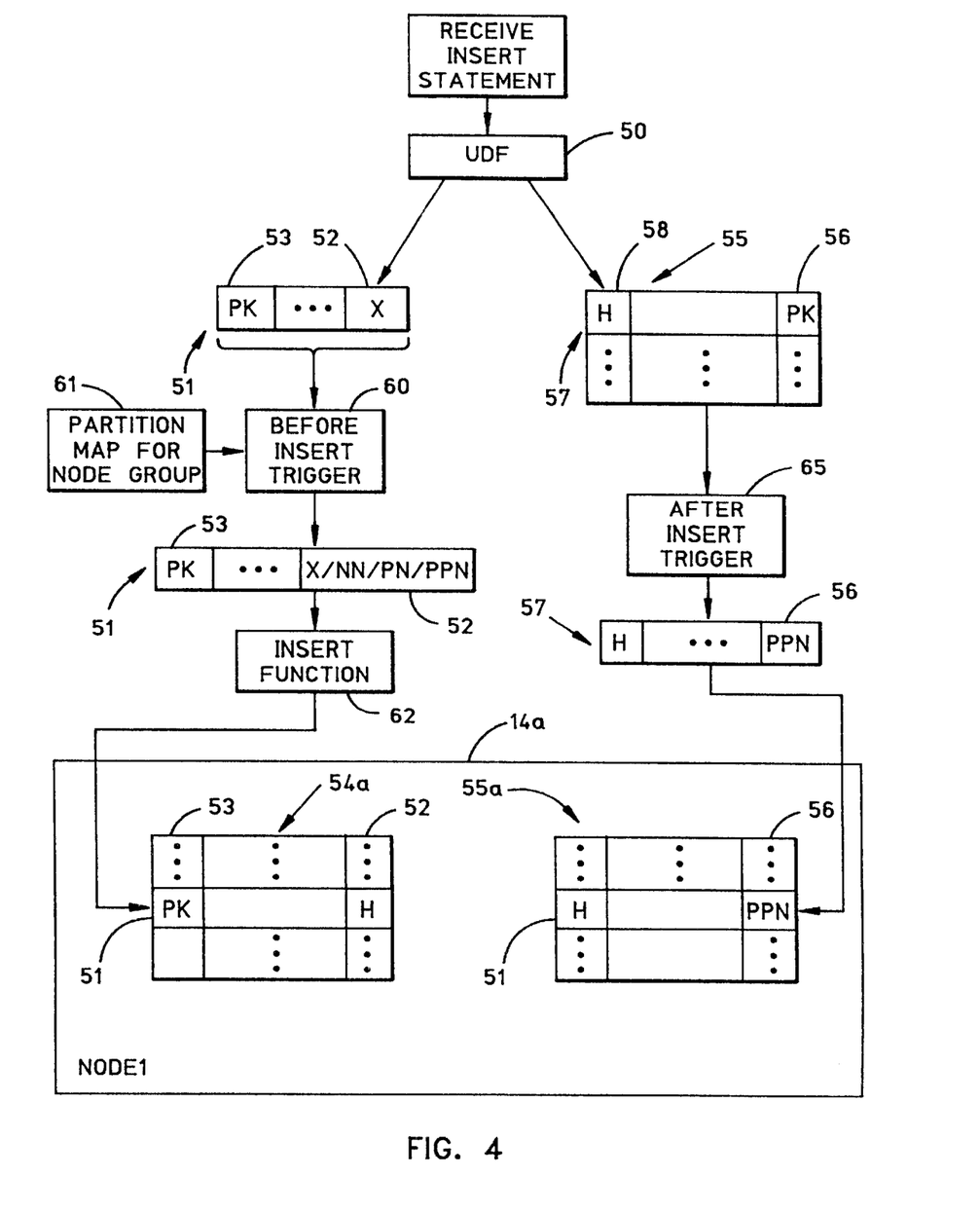
FIG. 4 shows the data flow of processing to collocate relational data and metadata.

FIG. 4 is a data flow diagram illustrating collocation of metadata table rows with corresponding partitions of a relational table. Using functions available in the DB2™ EEE, and new functions in this invention for any partitioned table, say table 28, the invention establishes one or more associated metadata tables that enable any row in the partitioned table and its related row or rows in the associated metadata table or tables to be located in the same node regardless of whether or not the tables have the same primary keys and regardless of the column definitions of the partitioning key columns defined for the relation table.

Presently, in the DB2™ EEE environment, the node where a row in a partitioned relation table will reside depends on the row's partition number (PN) and a partition map for that table that maps PNS to the nodes of a nodegroup. In this regard, a nodegroup is a group of nodes over which a partition is defined. In the DB2™ EEE environment the PN is an integer ranging from 0 to 4095. The PN for any row in a partitioned table is determined by the values of its partitioning key columns which are hashed into the range of integer values (0–4095). The partition map is an array of integers consisting of the node numbers for all the nodes in the defined node group over which the table is partitioned. All tables defined on the same node group share the same partition map. The PN is used an index to the partition map. In this explanation, three numbers are of interest: the node number (NN), the partition number (PN) and the pre-hashed partition number (PPN). In this regard, the node number is the number of the node yielded when the PN is indexed in the partition map. A PPN for any row in a partitioned table is a number that will hash to the same PN as the values in the partitioning key columns of the row. Manifestly, knowing the PPN obviates the need to access the values of partitioning key columns for any particular row after the row has been processed.

FIG. 4 illustrates how the invention takes advantage of these numbers to collocate metadata rows with corresponding relational table rows. First, an INSERT statement is received at the coordinating node of a partitioned database system, such as the database system illustrated in FIG. 1. Assume that this statement requests insertion of a row with an image into a relational table that includes an image column. DB2™ EEE processing uses a UDF 50 to generate a handle 52 with information X in it. The handle 52 is placed in a row 51 that includes information in one or more partitioning key (PK) fields, such as the field 53. For the row 51 to be inserted, the UDF 50 accesses one or more import metadata tables, such as the table 55. Based upon the complex data type in the row to be inserted, and other information in the INSERT command, the UDF 50 generates metadata for the row 51 and inserts it as row 57 into the import metadata table 55. The import metadata table 55 has a partition key (PK) column 56 with data inserted by the UDF 50. This process may be repeated using respective import metadata tables for all of the metadata tables defined by the relevant extender or extenders. After the UDF 50 has generated the handle 52 and placed the row 57 in the import metadata table 55, a "before insert" trigger 60 is fired. The trigger 60 invokes a built-in function of the DB2™ system (SYSIBM.PARTITION (col_name)) to determine the partition number for the row. That function, using the partition key values of the row 51 and a hashing algorithm, generates the PN and returns it to the trigger 60. To determine the NN for row 51, the trigger 60 invokes another a built-in function of the DB2™ system (SYSIBM.NODENUMBER (col_name)). That function determines the node number using the PN and a partition map 61 for the associated nodegroup. The node number is returned to the trigger 60. Finally, the trigger 60 calls a user-defined function (UDF) that obtains the PPN from the PN. These values (NN, PN, PPN) are inserted by the trigger 60 into the handle 52. The row 51 is then passed to a DB2™ insert function 62 that inserts the row 51 into the partition 54a of the table identified in the INSERT statement at the node identified by the value of NN. Processing then passes to an "after insert" trigger 65. The PPN in the handle 52 built by the trigger 60 is available to the trigger 65. Using the identity of the data object (in the "ID" column of the metadata table) the trigger 65 obtains the row 57 in the import metadata table 55, and inserts the PPN into the PK field 56 of the row 57. Having the PPN available, the trigger 65 identifies the node 14a where the row 51 was inserted into the relational table partition 54a. With the identification of the metadata table 55a and the number of the node 14a, the trigger 65 inserts the row 57 into the metadata table 55a and then deletes the row 57 from the import metadata table 55. The trigger repeats this process for as many import metadata tables as accompany the partitioned relational table.

Figure 5:
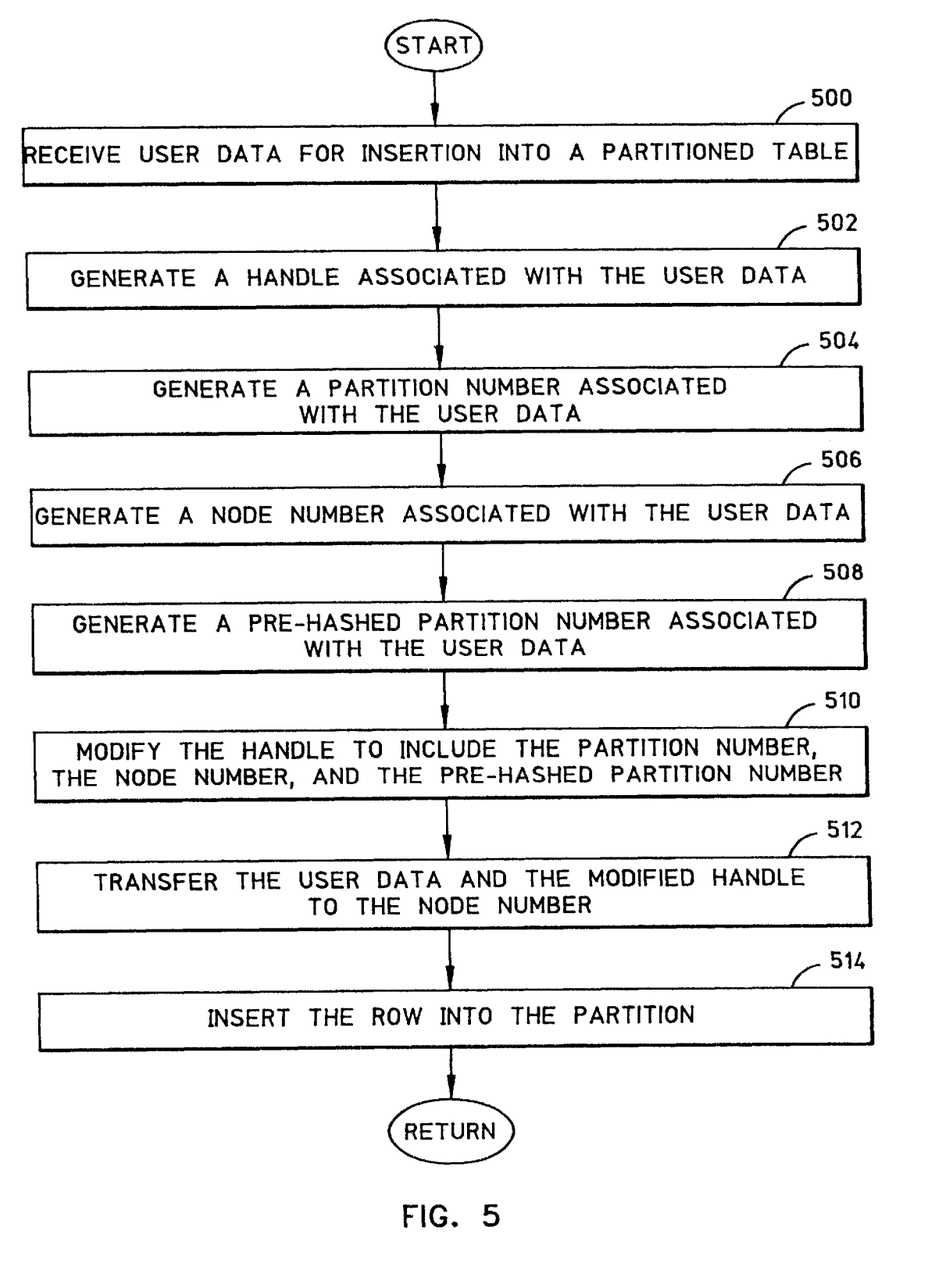
FIGS. 5 and 6 are flowcharts describing a method for collocating relational data and metadata.
Figure 6:
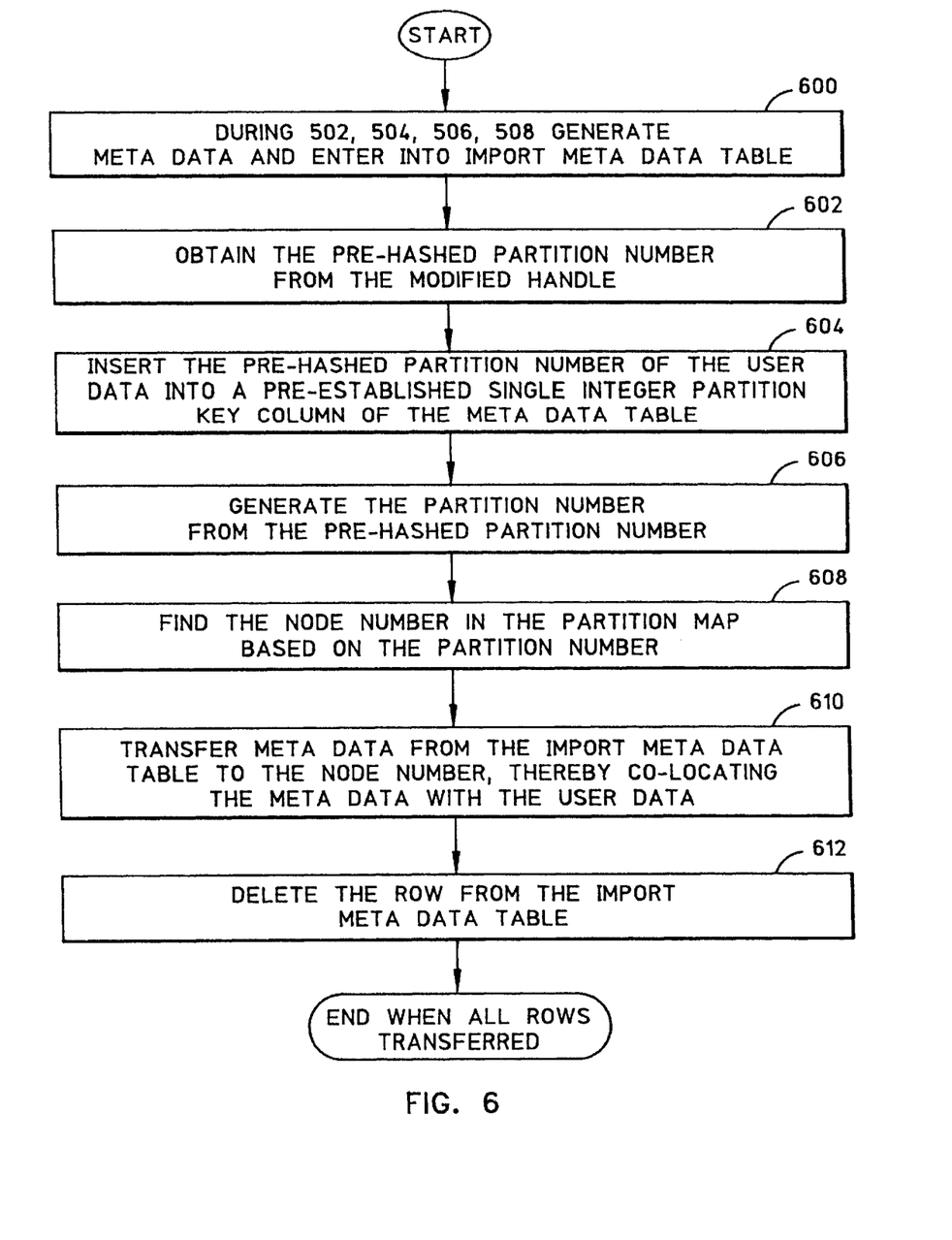

FIGS. 5 and 6 are flowcharts illustrating the method of collocating metadata with corresponding partitions of at least one relational table having at least one column defined for a complex data type. Although the description particularly illustrates an example of inserting data, the process may be similarly applied to "adding" and "updating" as well as to "deleting" as one skilled in the art will readily understand.

Referring to FIG. 5, a user wishes to insert data for storage into a partitioned database. The data, which includes a complex data type such as an image or an audio clip, are received at the coordinating node (step 500). For example, a user may wish to insert image data of an employee into a database. Table 1 below introduces a partitioned table named USER_TABLE where such data may be stored.

TABLE 1

USER_TABLE before insertion of user data

| NAME | EMPLOYEE NO. | IMAGE | HANDLE |
|---|---|---|---|
| Keesey | 123-12-1234 | ... xyz ... | handle1 |
| Jang | 432-43-4321 | ... rst ... | handle2 |

The user may wish to store particular data such as "Wilmot", "234-23-2345", and corresponding image data, which will ultimately be stored as a row in the USER_TABLE. The following instruction may be used to commence this process:

INSERT INTO USER_TABLE (NAME, EMPLOYEE NO., HANDLE)
   VALUES ('Wilmot', '234-23-2345',
   MMDBSYS.DB2IMAGE(CURRENT SERVER,
      'Wilmot.jpg',
   'JPG', 1, 'This is a picture of Wilmot in JPG format'))

Within the INSERT instruction, a user defined function (UDF) (such as MMDBSYS.DB2IMAGE) is executed first and returns a handle for the new row (step 502). For example, a handle "handle3" may be constructed for user data "Wilmot" and "234-23-2345".

Following execution of the UDF, the "before insert" trigger is fired. As described in more detail below, the trigger obtains three values: (1) a value for the partition number (PN) for the user data; (2) a value for the node number (NN) where the user data is to be located; and (3) a value for the pre-hashed partition number (PPN) that always hashes to the value of the partition number. The DB2™ EEE system provides the functions with which to obtain these values.

Using the DB2™ EEE function, the trigger obtains a partition number value based on values of the partition key column(s) of the table (step 504). The partition number value is hashed from partition key values into the range 0–4095 and is used as an index to a partition map containing node numbers. Typically, the partition key is based on user data in one or more predetermined columns of the table. For example, a partition number "pn3" may be obtained using a partition key based on both NAME ("Wilmot") and EMPLOYEE NO. ("234-23-2345") column data of USER_TABLE. Here, the following DB2™ function may be used:

SELECT SYSIBM.PARTITION (handle3)
      FROM USER_TABLE

Next, the before-insert trigger generates a node number value for the user data based on the partition number value (step 506). For example, a node number value "nn2" may be obtained using the partition number "pn3". Referring to Table 2 below, an exemplary partition map of a database system having three nodes illustrates that "pn3" is a partition number providing an index to "nn2" or node two.

TABLE 2

An exemplary partition map for a database system having three nodes.

| PARTITION NUMBER | NODE NUMBER |
|---|---|
| pn0 | nn1 |
| pn1 | nn3 |
| pn2 | nn2 |
| pn3 | nn2 |
| pn4 | nn1 |
| ... | ... |

Thus, the new row of user data will reside at "nn2" or node two of the system. Here, the following DB2™ EEE system function may be used:

SELECT SYSIBM.NODENUMBER (handle3)
      FROM USER_TABLE

The before insert trigger also uses a DB2™ EEE system routine to generate a pre-hashed value of the partition number (step 508). For example, a pre-hashed partition number value "ppn3" may be generated using "pn3" as an input argument. Here, a UDF, MDBSYS.PartitionHash (handle 3, pn3, nn2), may be executed, which utilizes the following DB2™ system-supplied API function:

sqluihsh(pn3,&ppn3,&sqlca)

Having these values, the before insert trigger routine inserts the partition number value, the node number value, and the pre-hashed partition number value into the handle previously obtained by the UDF (step 510). For example, "handle3_pn3_nn2_ppn3" may be created by inserting "pn3", "nn2" and "ppn3" into "handle3". The user data, including the modified handle, is inserted to the partitioned table (step 512). For example, as shown in Table 3 below, "Wilmot", "234-23-2345", the corresponding image data, and "handle3_pn3_nn2_ppn3" are inserted into row three of USER_DATA located at node two.

TABLE 3

USER_TABLE after user data including the modified handle are inserted

| NAME | EMPLOYEE NO. | IMAGE | HANDLE |
|---|---|---|---|
| Keesey | 123-12-1234 | ... xyz ... | handle1 |
| Jang | 432-43-4321 | ... rst ... | handle2 |
| Wilmot | 234-23-2345 | ... mno ... | handle3_pn3_nn2_ppn3 |

Next, the "after insert" trigger is fired. This is illustrated in the flowchart of FIG. 6. This trigger routine copies metadata from an import metadata table (which was previously generated based on a row inserted in the USER_TABLE) into a metadata table associated with the row of user data at the node where the row was inserted. Generally, the generation of metadata for an import metadata table and insertion of a row with the metadata into the table occurs with steps 502, 504, 506, 508, and 510 of FIG. 5. This is noted in step 600. Next, the routine obtains the pre-hashed partition number value from the modified handle (step 602) and inserts this value into a pre-established single integer partition key column in each import metadata table associated with the user data (step 604). Each single integer column is used as a partition key column for the metadata tables, which ensures that the metadata tables will be co-located with the user data at the same node when inserted. Exemplary metadata tables METADATA_A and METADATA_B are shown in tables 4 and 5 below.

TABLE 4

METADATA_A metadata table

| HANDLE | PARTITION KEY COLUMN | FILE SIZE | IMAGE |
|---|---|---|---|
| #1 | ppn4 | size1 | ... xyz ... |
| #2 | ppn2 | size2 | ... abc ... |
| #3 | ppn3 | size3 | ... mno ... |

TABLE 5

METADATA_B metadata table

| HANDLE | PARTITION KEY COLUMN | AVERAGE COLOR OF IMAGE | TEXTURE OF IMAGE |
|---|---|---|---|
| #1 | ppn4 | red | soft |
| #2 | ppn2 | red | soft |
| #3 | ppn3 | yellow | soft |

To transfer the metadata to the appropriate node, the partition number is generated from the pre-hashed partition number in the partition key column of the metadata table (step 606), and indexed to the correct node number in the partition map (step 608). Next, the metadata is transferred to the node number to thereby collocate the metadata with the user data (step 610). Finally, the transferred row is deleted from the import metadata table from which it was obtained (step 612).

OBIC Indexing

Figure 7:
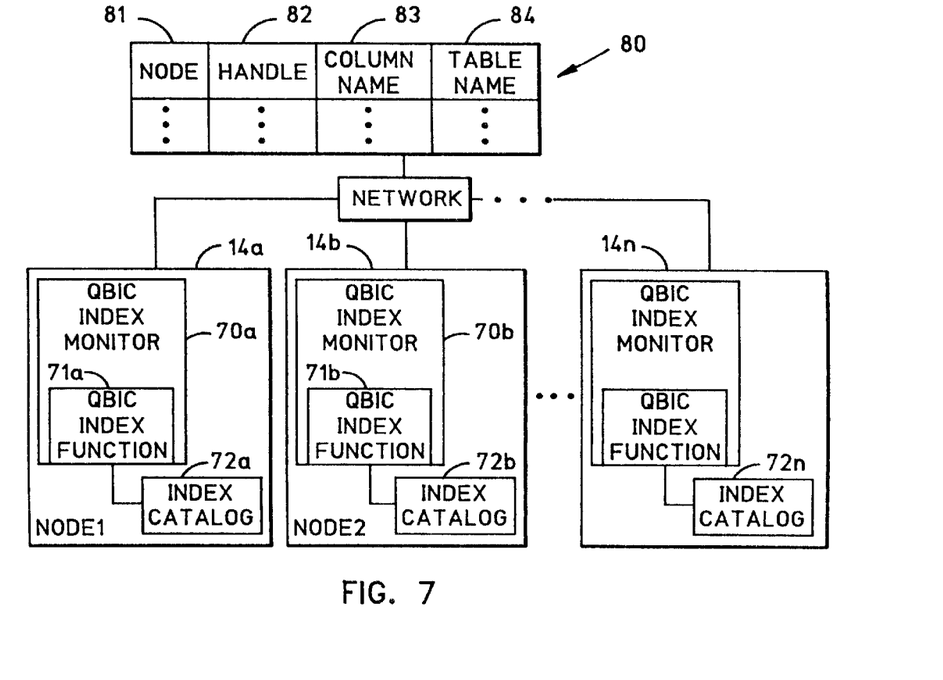
FIG. 7 is a block diagram showing image index processing according to this invention.

FIG. 7 illustrates distributed QBIC index processing according to the invention. In this regard, FIG. 7 illustrates a further function on each of the nodes 14a, 14b, 14n of the system 10 of FIG. 1. The function is a QBIC index monitor that runs on each node. Thus index monitors 70a, 70b, and 70n run on nodes 14a, 14b, and 14n, respectively. Each of these monitors includes an existing QBIC index function that extracts feature data from an image and constructs and catalogs an index at the node where the image is stored. The collection of indexes at any node support QBIC query processing at the node. The QBIC index functions are 71a, 71b, and 71n. The catalogs maintained by those functions are 72a, 72b, and 72n, respectively. The indexes are not shown, but all indexes in any catalog are stored at the catalog's node. A QBIC index control table 80, visible on all nodes, includes a column 81 for node numbers (NN), a column 82 for handles, a column 83 for column name, and a column 84 for relational table names. During processing of an INSERT statement, the before insert trigger that is fired to generate the information that is added to the handle of the image being inserted, makes an entry into to the table 80 that includes the value of the NN, the handle of the image, the name of the column in relational table that establishes the data type of the image, and the name of the table into which the corresponding row is to be inserted. Each index monitor continuously observes the QBIC index table 80, responding whenever any image handle is in the control table 80 and the value of the node number in the handle is equal to the monitor's. If the condition is true, the handle is passed to the QBIC index function which retrieves the collocated image, indexes it, stores the indexed feature data in index files that are local to the node, and catalogs the index. For integrity, when this process is completed, the monitor removes the entry in the QBIC index table 80.

Figure 8:
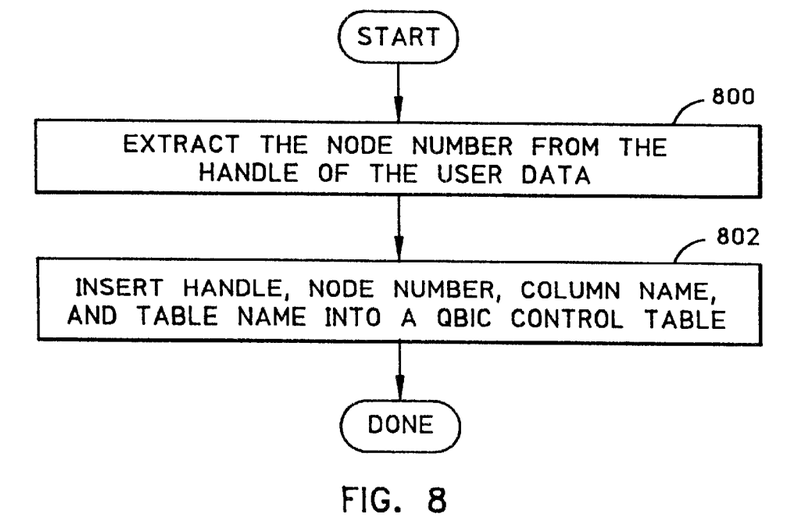
FIGS. 8 and 9 are flowcharts describing a method of image index processing.
Figure 9:
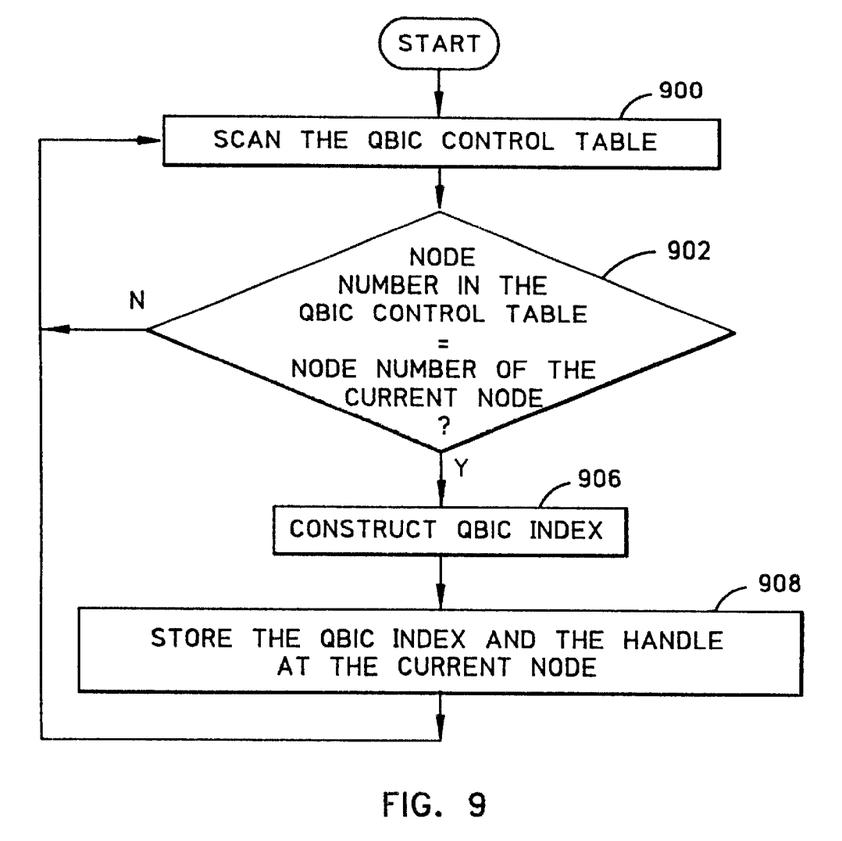

FIGS. 8 and 9 are flowcharts describing a method of collocating a QBIC index catalog of the user data at the appropriate node. In FIG. 8, a QBIC trigger routine is executed in response to a modification of the table (such as the insertion of user data into USER_TABLE as described in relation to FIG. 5). The QBIC trigger routine extracts the node number from the handle (step 800). The QBIC trigger routine inserts the node number, the handle, the column name, and the table name into an appropriate QBIC control table (step 802). In this example, the QBIC control table is a MMDBSYS.QBICADD or MMDBSYS.QBICINSERT table, but may be a MMDBSYS.QBICDELETE or a MMDBSYS.QBICUPDATE for other cases. The QBIC control tables are global tables which are "seen" at all nodes.

Each node has a QBIC index monitor process to perform the method described in the flowchart of FIG. 9. At each node, the node's QBIC index monitor scans the QBIC control tables (step 900), such as the MMDBSYS.QBIC INSERT table. The monitor checks if the node number in the QBIC control table matches the node number of the current scanning node (step 902). If this is not true, the monitor continues scanning at step 900. If there is a match at step 902, then the QBIC index monitor constructs a QBIC index for the user data (step 906) and stores the QBIC index and the handle in an index catalog at the current node (step 908). The method repeats at step 900 where the QBIC index monitor continues scanning the QBIC control tables. The following instructions may be used in each QBIC monitor:

do forever
{
EXEC SQL SELECT HANDLE FROM MMDB-SYS.QBICADD
  WHERE NODE="MY_NODE"
QBCATALOGIMAGE(HANDLE)
EXEC SQL DELETE FROM MMDBSYS.QBICADD
  WHERE HANDLE=OLD_HANDLE
EXEC SQL SELECT HANDLE FROM MMDB-SYS.QBICDELETE
  WHERE NODE="MY_NODE"
QBCATALOGIMAGE(HANDLE)
EXEC SQL DELETE FROM MMDBSYS.QBICDE-LETE
  WHERE HANDLE=OLD_HANDLE
EXEC SQL SELECT HANDLE FROM MMDB-SYS.QBICUPDATE
  WHERE NODE="MY_NODE"
QBCATALOGIMAGE(HANDLE)
EXEC SQL DELETE FROM MMDBSYS.QBICUP-DATE
  WHERE HANDLE=OLD_HANDLE
SLEEP
}
end loop Thus, the user data, attribute data (metadata), and index catalog data are collocated at a single node. Partitioned image query processing is now possible.

Partitioned Image Query Processing

Figure 10:
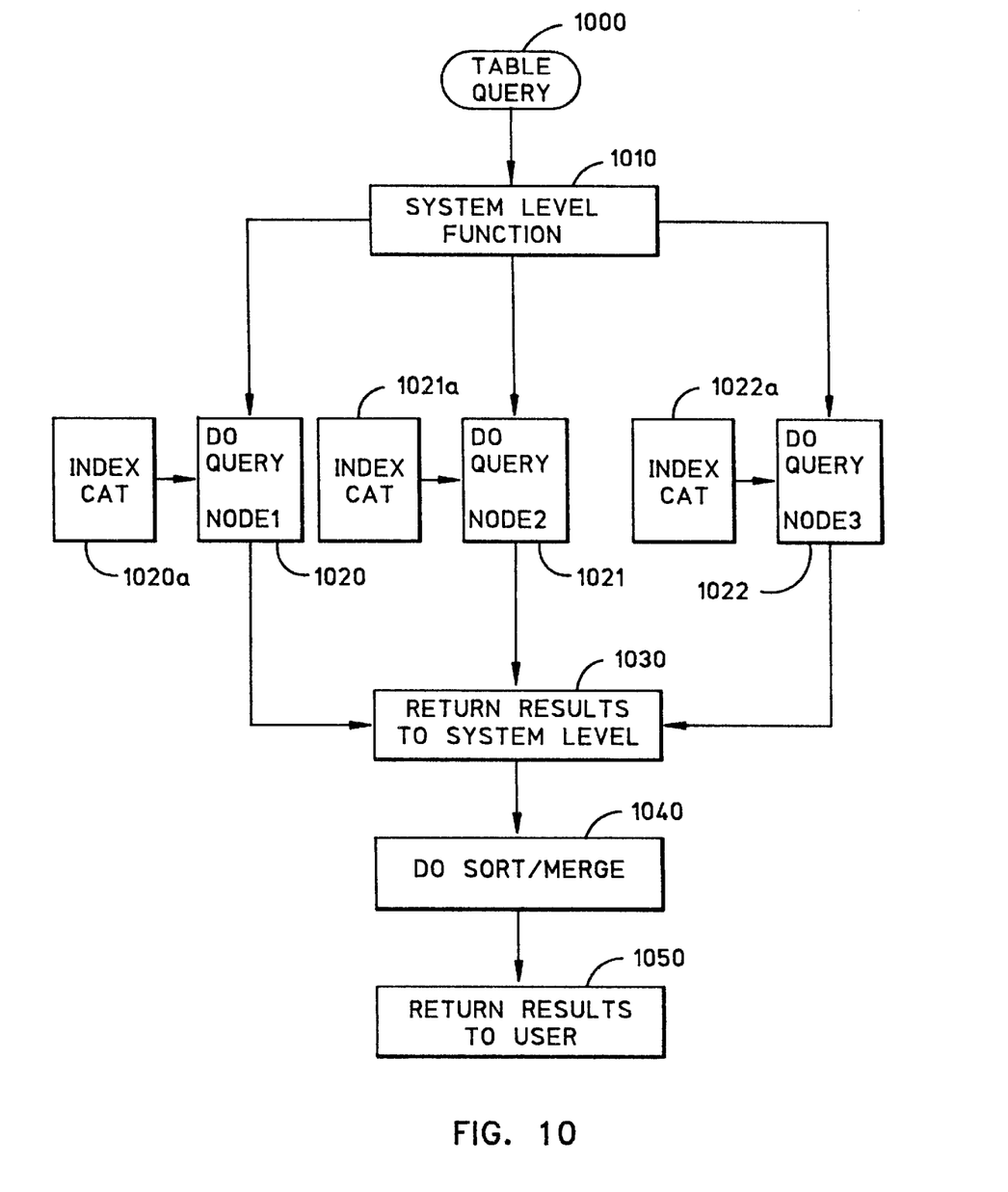
FIG. 10 is a combination block diagram and flowchart describing the processing of an image query directed to a table.

FIG. 10 illustrates the process flow for executing a table query according to the invention. Recall that a table query is of the form "Find all images in Table y with an average color of about ( )". This query will execute against Table y, returning a ranked list of the top n score/handle pairs. The cutoff number n can either be a default value or a value set in the query statement by the user. QBIC processing returns a result set that identifies images by their handles and ranks the handles according to the proximity of their corresponding images to the average color. For example, the first handle on the list identifies the image recorded in Table y that has an average color closest to that specified in the query, and so on. Refer to FIG. 10 for an understanding of how such a query is conducted according to this invention. The query is received by a partitioned database system in which an image extender has been enabled and in which metadata processing and indexing processing have been conducted according to the description given above. Receipt of the table query 1000 is by a table UDF 1010 that identifies the nodegroup over which Table y has been partitioned. The UDF 1010 then passes the query to each of the nodes in the nodegroup. Assuming a nodegroup with three nodes, the query is executed, in parallel, at the three nodes in steps 1020, 1021, and 1022. As is conventional in QBIC query processing, a query is processed using indexes by way of index catalogs 1020a, 1021a and 1022a. Each node constructs a result set comprising the handles of the images satisfying the query parameters and ordering the handles according to the distance criterion, for example. Since the results sets produced at the nodes are the size of the result set to be returned to the user, additional processing is required in order to limit the size of the result set that is returned to the user. In this regard, the result sets are returned from each of the nodes to a system level function at step 1030. At step 1040, the UDF combines the three result sets into a single result set of prescribed size by conducting a sort/merge process on the three result sets returned by the nodes. The result of the sort/merge process is returned in step 1050 to the user as a list of image handles ranked according to the criteria of the query.

Figure 11:
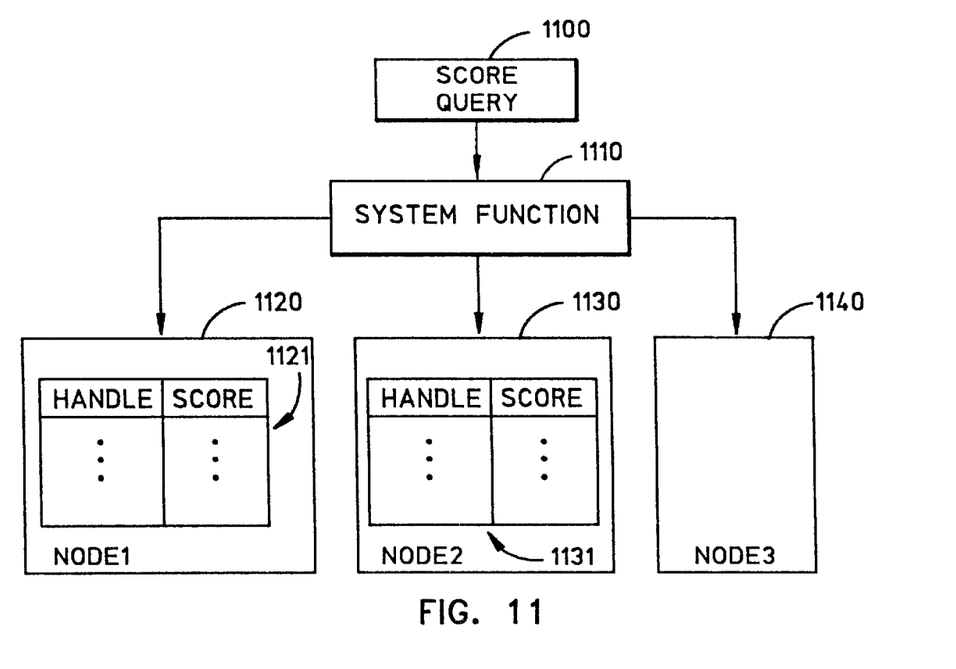
FIG. 11 is a block diagram illustrating structures of arrays for processing a score image query.
Figure 12:
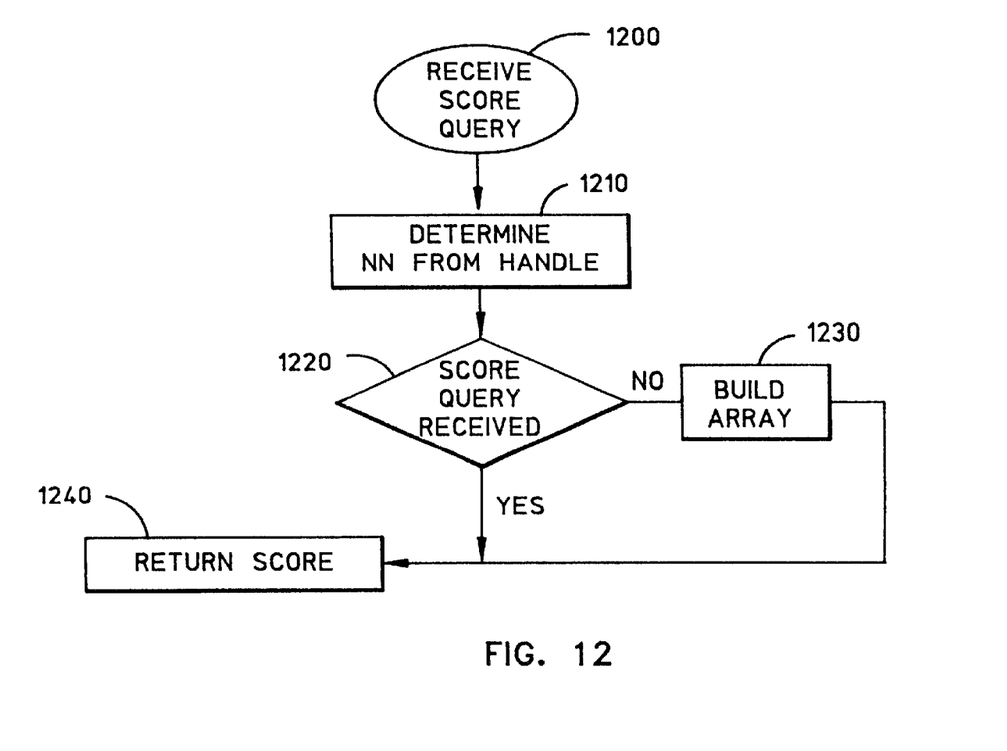
FIG. 12 is a flowchart describing a method for executing a score image query.

Consider now a score query of the form "How close is the average color of image, to red". Typically such a statement is one of a sequence of score statements in which only the identification of the image is varied as a user attempts to match identified images to some other image or to specific values of a specified set of image features. Typically the images are listed in the same relational table. In the partitioned database context, it would be inefficient to conduct a score query more than one time against any partition. According to the invention, once a score query is received at any node for first time, the query is executed against all images of the relational table partition that contains the image that is the subject of the first query. This means that score query processing is conducted only once at any node and also that such processing might not be conducted at one or more nodes. In this regard, refer to FIGS. 11 and 12 which presume the three-node nodegroup illustrated in FIG. 10. In FIG. 11 the score query 1100 is received by system function 1110 and sent to node one for execution at 1120. Assume that the system determines that the image is in a partition of Table y stored at node one. Assume also that this is the first score query for the partition of Table y at node one. Node one conducts QBIC score query processing on all images of the Table y partition and constructs a result array 1 121 each of whose entries includes the handle for a image listed in the Table y partition and the score for that image in the context of the score query. As shown in FIG. 11, node two at 1 130 has also received a score query against its partition of Table y, constructing a result array 1 131. However, node three at 1140 has not received a score query against its partition of Table y and therefore has not undertaken any processing in this regard. FIG. 12 illustrates the method by which the processing illustrated in FIG. 11 is accomplished. A score query is received at 1200. A system level function in step 1210 determines, from the handle of the image, the node number where the partition for the image object is stored. In this step, the query is sent to the identified node. In step 1220, in response to receipt of the query, the node identified in the handle decides whether a score query has been received against the partition that it owns. If not, it calculates a score against every image listed in the partition for the catalog in step 1230 and then returns the score for the image identified in the handle in step 1240. Otherwise, if the array has already been built, this score is obtained from the array and is returned in step 1240. The processing of FIG. 12 loops for each node in a nodegroup that has conducted a score query subject to constraints that may be user defined or may be built into the system. Such constraints may include a time-out, a user session sign-off, and so.

Clearly, the other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

We claim:

1. A computer-executed method for changing a relational table in a partitioned relational database system, the relational table having at least one column defined for a complex data type, the system including one or more metadata tables for extending a relation defined by the relational table, comprising:

dividing the relational table into partitions;

storing each partition at a respective node of the system; and for each partition, storing rows of a metadata table that are associated with contents of the partition at the node where the partition is stored.

2. The method of claim 1, wherein the complex data type is an image data type.

3. A computer-executed method for entering information concerning a complex data type into a partitioned database of a relational database processing system, the database including one or more metadata tables for extending a relation of the database, comprising:

receiving a complex data object for storage in the database;

determining a location of a partition of the database in which the object is to be entered;

entering the object in the partition; and storing relational extender metadata information for the object at the location.

4. The method of claim 3, wherein the complex data object is an image.

5. A computer-executed method for processing images in a partitioned relational database system, comprising:

receiving a request to insert an image into a partitioned table;

determining a node of the system where a partition of the table is stored;

storing an entry representing the image in the partition; and at the node, generating an index representing the image and cataloging the index.

6. A computer-executed method for processing images in a relational database processing system with a partitioned database, comprising:

receiving an image to be stored in the partitioned database;

determining a database partition where the image is to be stored;

storing an entry representing the image in the partition; and at the partition, generating an index representing the image and cataloging the index.

7. A computer-executed method for processing an image query in a relational database processing system with a partitioned database, comprising:

receiving a request to execute a query identifying an image stored in the partitioned database;

determining a database partition containing a reference to the image;

executing the query against all images referenced in the partition; and returning a result of the query execution.

8. A computer-executed method for processing an image query in a database processing system with a partitioned database, comprising:

receiving a request to execute an image query identifying a table containing at least one image data type that is stored in the partitioned database;

determining nodes of the system where all partitions of the table are stored;

executing the query at each of the nodes;

receiving from each node results of the query execution;

merging the results from all of the nodes into a single result; and returning the single result.

9. A relational database processing system for changing a relational table in a partitioned relational database system including at least one relational table having at least one column defined for a complex data type, the database system including one or more metadata tables for extending a relation defined by the relational table, comprising:

the relational table being divided into partitions;

each partition being stored at a respective node of the system; and for each partition, rows of a metadata table that are associated with contents of the partition being stored at the node where the partition is stored.

10. The system of claim 9, wherein the complex data type is an image data type.

11. A relational database processing system for entering information concerning a complex data type into a partitioned database, the database including one or more metadata tables for extending a relation of the database, comprising:

at least one relational table with at least one column defining a complex data type;

the table being divided into partitions, each partition being stored at a particular system location; and relational extender metadata information associated with each partition being stored at the location where the partition is stored.

12. The system of claim 11, wherein the complex data object is an image.

13. A partitioned database system for processing images, comprising:

a partitioned table having at least one column for defining an image data type;

each partition being stored at a node of the system; and at each node, means for generating at least one index representing an image referenced in the partition stored at the node.

14. A database processing system with a partitioned database for processing images, comprising:

means for determining a database partition where an image is to be stored;

means for storing an entry representing the image in the partition; and at the partition, means for generating an index representing the image and cataloging the index.

15. A database processing system with a partitioned database for processing a query identifying an image stored in the partitioned database, comprising:

means for determining a database partition containing a reference to the image;

means for executing the query against all images referenced in the partition; and means for returning a result of the query execution.

16. A database processing system with a partitioned database for processing an image query identifying a table containing at least one image data type that is stored in the partitioned database, comprising:

means for determining nodes of the system where all partitions of the table are stored;

means for executing the query at each of the nodes;

means for receiving from each node results of the query execution;

means for merging the results from all of the nodes into a single result; and means for returning the single result.

17. Computer software for changing a relational table in a partitioned relational database system, the relational table having at least one column defined for a complex data type, the system including one or more metadata tables for extending a relation defined by the relational table, the computer executable code comprising:

software executable for dividing the relational table into partitions;

software executable for storing each partition at a respective node of the system; and software executable for storing rows of a metadata table for each partition, the rows being associated with contents of the partition at the node where the partition is stored.

18. The computer executable code of claim 17, wherein the complex data type is an image data type.

19. Computer software for processing an image query in a database processing system with a partitioned database, the computer executable code comprising:

software executable to receive a request to execute an image query identifying a table containing at least one image data type that is stored in the partitioned database;

software executable to determine nodes of the system where all partitions of the table are stored;

software executable to execute the query at each of the nodes;

software executable to receive from each node results of the query execution;

software executable to merge the results from all of the nodes into a single result; and software executable to return the single result.

20. A computer readable code means on a computer usable medium for changing a relational table in a partitioned relational database system, the relational table having at least one column defined for a complex data type, the system including one or more metadata tables for extending a relation defined by the relational table, the computer readable code means comprising:

dividing the relational table into partitions;

storing each partition at a respective node of the systems; and for each partition, storing rows of a metadata table that are associated with contents of the partition at the node where the partition is stored.

21. The computer readable code means of claim 20, wherein the complex data type is an image data type.

22. A computer readable code means on a computer usable medium for entering information concerning a complex data type into a partitioned database of a relational database processing system, the database including one or more metadata tables for extending a relation of the database, the computer readable code means comprising:

receiving a complex data object for storage in the database;

determining a location of a partition of the database in which the object is to be entered;

entering the object in the partition; and storing relational extender metadata information for the object at the location.

23. The computer readable code means of claim 22, wherein the complex data object is an image.

24. A computer readable code means on a computer usable medium for processing images in a partitioned relational database system, the computer readable code means comprising:

receiving a request to insert an image into a partitioned table;

determining a node of the system where a partition of the table is stored;

storing an entry representing the image in the partition; and at the node, generating an index representing the image and cataloging the index.

25. A computer readable code means on a computer usable medium for processing images in a relational database processing system with a partitioned database, the computer code means comprising:

receiving an image to be stored in the partitioned database;

determining a database partition where the image is to be stored;

storing an entry representing the image in the partition; and at the partition, generating an index representing the image and cataloging the index.

26. A computer readable code means on a computer usable medium for processing an image query in a relational database processing system with a partitioned database, the computer readable code means comprising:

receiving an request to execute a query identifying an image stored in the partitioned database;

determining a database partition containing a reference to the image;

executing the query against all images referenced in the partition; and returning a result of the query execution.

27. A computer readable code means on a computer usable medium for processing an image query in a database processing system with a partitioned database, the computer readable code means comprising:

receiving a request to execute an image query identifying a table containing at least one image data type that is stored in the partitioned database;

determining nodes of the system where all partitions of the table are stored;

executing the query at each of the nodes;

receiving from each node results of the query execution;

merging the results from all of the nodes into a single result; and returning the single result.

* * * * *